United States Patent
Ji et al.

(10) Patent No.: US 8,599,308 B2
(45) Date of Patent: Dec. 3, 2013

(54) PHOTOGRAPHING APPARATUS HAVING SIMPLE STRUCTURE WHEREBY DUST IS REMOVED FROM AN ENTIRE AREA OF A VIBRATION PLATE CORRESPONDING TO AN IMAGING DEVICE

(75) Inventors: Eun-ho Ji, Yongin-si (KR); Chi-hun Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/282,883

(22) Filed: Oct. 27, 2011

(65) Prior Publication Data

US 2012/0287335 A1    Nov. 15, 2012

(30) Foreign Application Priority Data

May 13, 2011    (KR) .................. 10-2011-0044876

(51) Int. Cl.
*H04N 5/225*    (2006.01)

(52) U.S. Cl.
USPC .......................................... 348/373; 348/374

(58) Field of Classification Search
None
See application file for complete search history.

(56) References Cited

U.S. PATENT DOCUMENTS

| | | | |
|---|---|---|---|
| 7,492,408 B2 * | 2/2009 | Ito | 348/335 |
| 7,978,220 B2 * | 7/2011 | Urakami et al. | 348/207.99 |
| 8,085,336 B2 * | 12/2011 | Urakami et al. | 348/340 |
| 8,199,200 B2 * | 6/2012 | Kawai et al. | 348/205 |
| 2004/0169761 A1 | 9/2004 | Kawai et al. | |
| 2007/0223966 A1 | 9/2007 | Fujimoto | |
| 2009/0002825 A1 | 1/2009 | Morita et al. | |
| 2009/0213236 A1 | 8/2009 | Chiou et al. | |
| 2009/0323187 A1 * | 12/2009 | Katsuda | 359/508 |
| 2010/0118402 A1 | 5/2010 | Washisu | |

FOREIGN PATENT DOCUMENTS

| | | |
|---|---|---|
| JP | 2008-292515 A | 12/2008 |
| KR | 10-1999-0055039 A | 7/1999 |
| KR | 10-2008-0085570 A | 9/2008 |

OTHER PUBLICATIONS

PCT Search Report and Written Opinion established for PCT/KR2012/003606 (Nov. 7, 2012).

* cited by examiner

*Primary Examiner* — Luong T Nguyen
(74) *Attorney, Agent, or Firm* — Drinker Biddle & Reath LLP

(57) ABSTRACT

A photographing apparatus includes an imaging device that converts an optical image of an object into an electrical signal; a vibration plate disposed at a front direction of the imaging device; a vibration generator which is mounted on the vibration plate and vibrates the vibration plate; a support frame which is located between the imaging device and the vibration plate, and supports edges of the vibration plate; and a vibration plate pressing unit which is connected in the support frame and includes a part which presses at least an area of the vibration plate.

16 Claims, 8 Drawing Sheets

PHOTOGRAPHING APPARATUS HAVING SIMPLE STRUCTURE WHEREBY DUST IS REMOVED FROM AN ENTIRE AREA OF A VIBRATION PLATE CORRESPONDING TO AN IMAGING DEVICE

CROSS-REFERENCE TO RELATED PATENT APPLICATION

This application claims the priority benefit of Korean Patent Application No. 10-2011-0044876, filed on May 13, 2011, in the Korean Intellectual Property Office, the disclosure of which is incorporated herein in its entirety by reference.

BACKGROUND

1. Field

One or more embodiments relate to a photographing apparatus, and more particularly, to a photographing apparatus having a simple structure whereby dust is efficiently removed from an entire area of a vibration plate corresponding to an imaging device.

2. Description of the Related Art

Digital image photographing apparatuses generally include a built-in imaging device. Recently, as the number of pixels of the imaging device has been increased, a pixel pitch has been made smaller. Accordingly, dust formed near the imaging device may appear as a shadow or spot in a photographed image, thereby degrading the image quality.

In the case of conventional cameras with a dust removing function, dust is removed by using an ultrasonic wave or an electromagnetic force. Recently, dust has been removed mainly by using a vibration source such as a piezoelectric device. However, as only one resonant mode is created in a vibration plate for one frequency, a vibration which is effective for removing dust is not generated in a node portion of the vibration, thereby resulting in an area in which dust is not removed.

SUMMARY

Embodiments include a photographing apparatus having a simple structure whereby dust formed on an imaging device may be effectively removed from an entire area of a vibration plate corresponding to the imaging device.

According to an embodiment, a photographing apparatus includes: an imaging device that converts an optical image of an object into an electrical signal; a vibration plate disposed at a front direction of the imaging device; a vibration generator which is mounted on the vibration plate and vibrates the vibration plate; a support frame which is located between the imaging device and the vibration plate, and supports edges of the vibration plate; and a vibration plate pressing unit which is connected to the support frame and includes a part which presses at least an area of the vibrating plate.

In the photographing apparatus having the above structure, a vibration may be separated and transmitted to the vibration plate by using the vibration plate pressing unit. Therefore, as different types of vibrations are transmitted to the vibration plate, a node portion of the vibration is minimized, thereby improving the performance of removing dust.

The vibration plate pressing unit may include a part in contact with the vibration plate for pressing at least an area of a front surface of the vibration plate.

The support frame may include a protruding portion which protrudes toward the vibration plate and supports a rear side of the vibration plate, and the protruding portion may be located at a position corresponding to an area of the vibration plate which is pressed by the vibration plate pressing unit.

The vibration plate may be a low pass filter (LPF).

The vibration generator may be a piezoelectric device.

The vibration plate pressing unit may include a connection portion which extends from the support frame toward the object and is separated from the vibration plate, and a bending portion which bends at the connection portion and extends along a front surface of the vibration plate.

An end of the bending portion may be inclined to press the vibration plate.

The bending portion may further include a protruding projection portion that presses the vibration plate.

The photographing apparatus may further include a vibration buffering unit which is disposed between the support frame and the vibration plate and buffers a vibration of the vibration plate.

The vibration buffering unit may include a groove which is formed in an area corresponding to the protruding portion so that the protruding portion penetrates toward the vibration plate.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, exemplary embodiments will be described with reference to the accompanying drawings. A front direction of a photographing apparatus is a direction toward an object.

Figure 1:
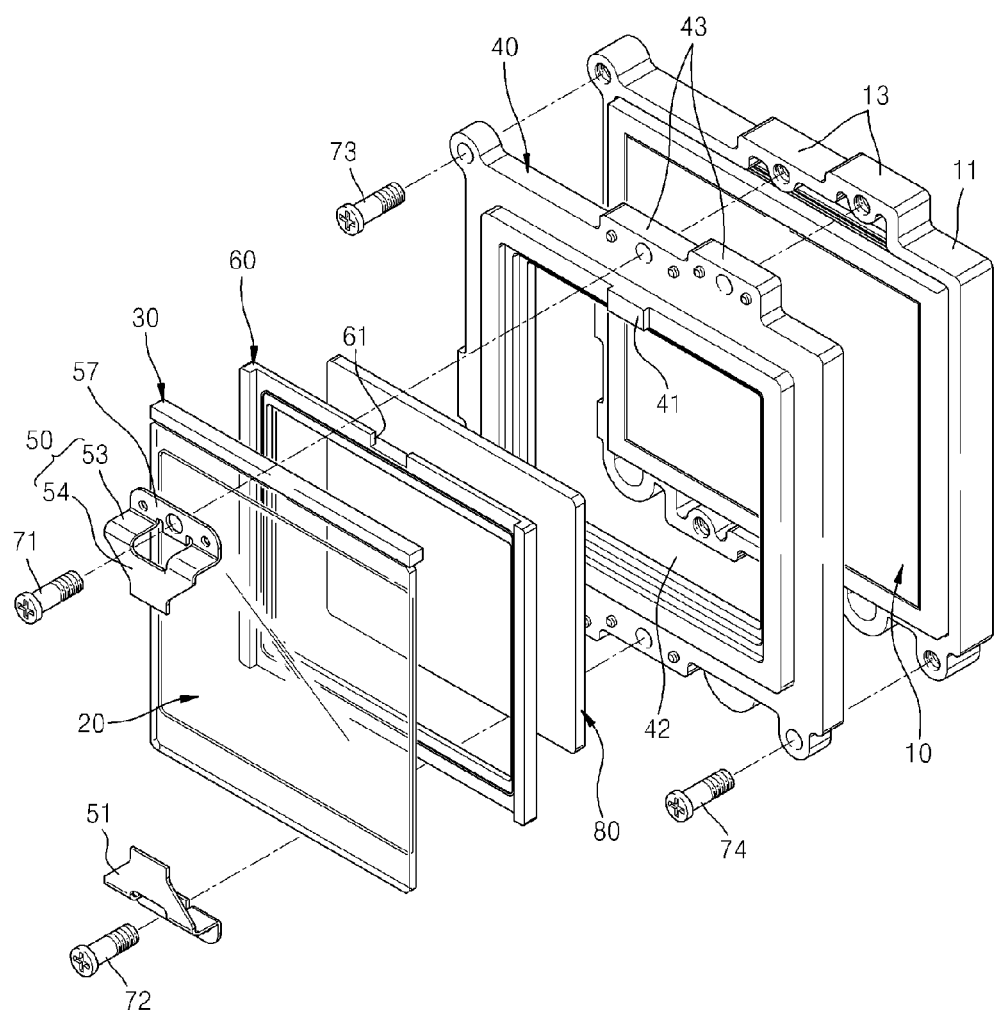
FIG. 1 is a perspective view illustrating individual elements of a photographing apparatus, according to an embodiment.
Figure 2:
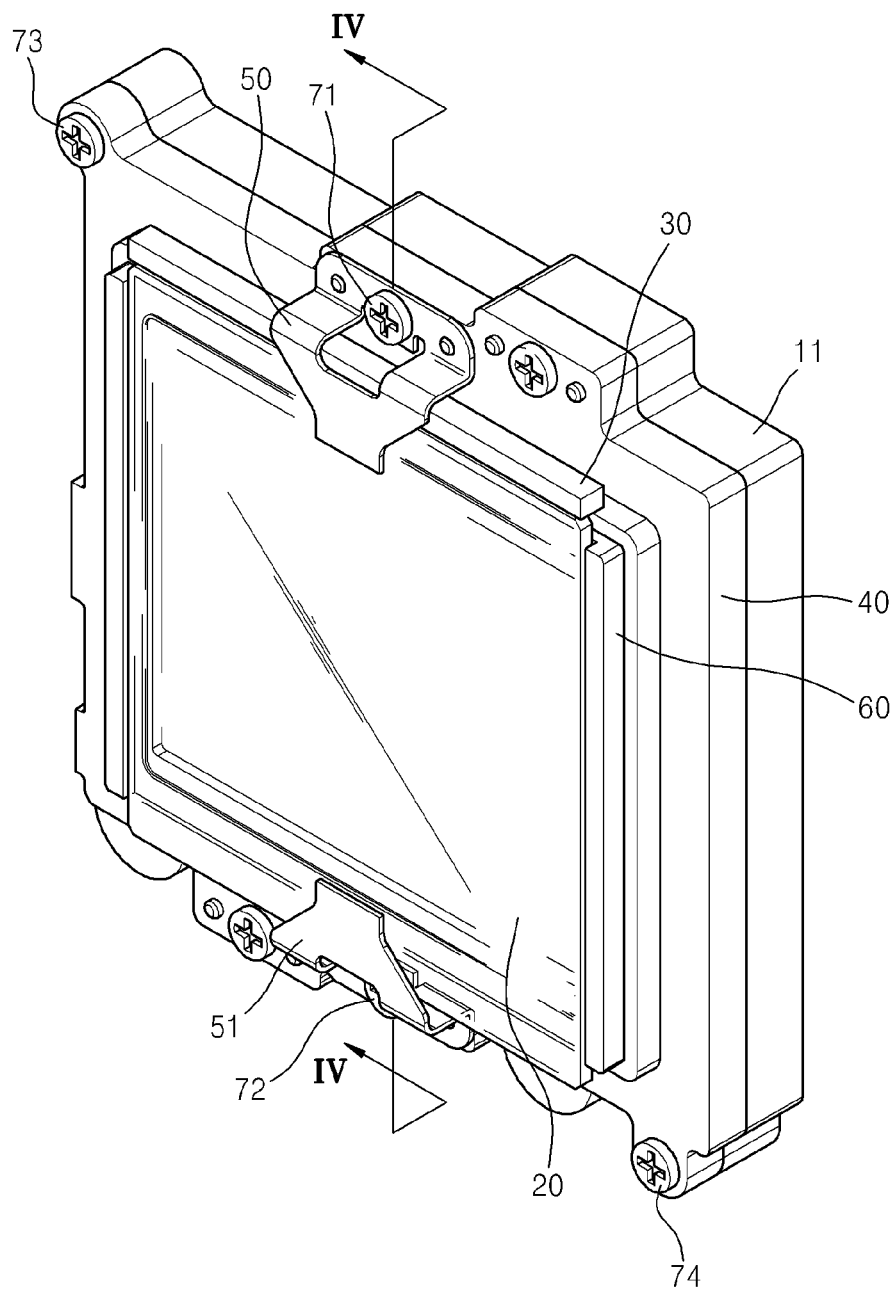
FIG. 2 is a perspective view illustrating the photographic apparatus of FIG. 1 in which the individual elements are coupled, according to an embodiment.

FIG. 1 is a perspective view illustrating individual elements of a photographing apparatus, according to an embodiment, and FIG. 2 is a perspective view illustrating the photographing apparatus of FIG. 1 in which the individual elements are coupled, according to an embodiment.

The photographing apparatus in the embodiment of FIG. 1 includes an imaging device 10, a vibration plate 20, a vibration generator 30, a support frame 40, and a vibration plate pressing unit 50.

The imaging device 10 converts an optical image of an object into an electrical signal. Image light of the object is formed on an image forming surface of the imaging device 10 by penetrating through a photographing optical system (not illustrated). The imaging device 10 may be a photoelectric conversable device, for example, a charge coupled device (CCD) or a complementary metal-oxide semiconductor (CMOS).

The vibration plate 20 is an optical device located at a front direction of the imaging device 10 and is penetrated by an incident light. Generally, the vibration plate 20 may be a low pass filter (LPF), however, this should not be construed as limiting. As light reflected from the object enters the imaging device 10 through the vibration plate 20, when fine dust accumulates on the vibration plate 20, a shadow may be generated in the photographed image.

The vibration generator 30 is a device that generates a vibration in response to an electrical signal. The vibration generator 30 may be a piezoelectric device. A mini driving motor may be manufactured by using the piezoelectric device. When an alternating current (AC) is applied to the piezoelectric device, the piezoelectric device generates a vibration having a specific frequency according to a driving waveform of the applied electric current.

The vibration generator 30 is mounted on a side of the vibration plate 20 and transmits the generated vibration to the vibration plate 20 in order to remove fine dust accumulated on the vibration plate 20.

The support frame 40 is located between the imaging device 10 and the vibration plate 20 and supports edges of the vibration plate 20. The support frame 40 extends along an edge of the vibration plate 20 so that the light may penetrate the vibration plate 20.

The support frame 40 includes a mounting portion 43. The mounting portion 43 is disposed at edges of the support frame 40, and an imaging device support unit 11 that supports the imaging device 10 includes a mounting portion 13 corresponding to the mounting portion 43. The vibration plate pressing unit 50 also includes a mounting portion 57 corresponding to the mounting portions 13 and 43.

The support frame 40 supporting the vibration plate 20, the imaging device support unit 11 supporting the imaging device 10, and the vibration plate pressing unit 50 are coupled to each other by using coupling units 71, 72, 73, and 74. The coupling units 71, 72, 73, and 74 may be bolts.

Bolts may be inserted into mounting units of mounting portions 13, 43, and 57. The coupling units 71, 72, 73, and 74 may also be pins, adhesive, or adhesive bandages.

The support frame 40 may include a protruding portion 41 which protrudes toward the vibration plate 20 to support a rear side of the vibration plate 20. The protruding portion 41 is located at a position corresponding to an area of the vibration plate 20 which is pressed by the vibration plate pressing unit 50.

A vibration buffering unit 60 may be interposed between the support frame 40 and the vibration plate 20 and be formed of a flexible material to allow a vibration to propagate in the vibration plate 20. The vibration buffering unit 60 buffers a vibration of the vibration plate 20 so as to prevent an effect of the vibration on the other elements of the photographing apparatus except the vibration plate 20. The vibration buffering unit 60 may include a groove formed in an area which corresponds to the protruding portion 41 of the support frame 40 so that the protruding portion 41 penetrates toward the vibration plate 20.

The vibration plate pressing unit 50 is connected to the support frame 40 and includes a part which presses at least an area of the vibration plate 20. In the current embodiment, just one vibration plate pressing unit 50 is included. However, the number of the vibration plate pressing unit 50 is not limited to one.

As illustrated in FIG. 1, the vibration plate pressing unit 50 may press the area corresponding to a center of an edge of the vibration plate 20, but is not limited thereto. That is, the vibration plate pressing unit 50 may be modified to press an area off the center of an edge of the vibration plate 20.

In the current embodiment, a connection member 51 may further be included to connect the support frame 40 and the vibration plate 20 at a location where it faces the vibration plate pressing unit 50. A rubber may be disposed between the connection member 51 and the vibration plate 20 so that the connection member 51 does not press the vibration plate.

The photographing apparatus of FIG. 1 may further include an optical device 80 such as a filter or the like.

Figure 3:
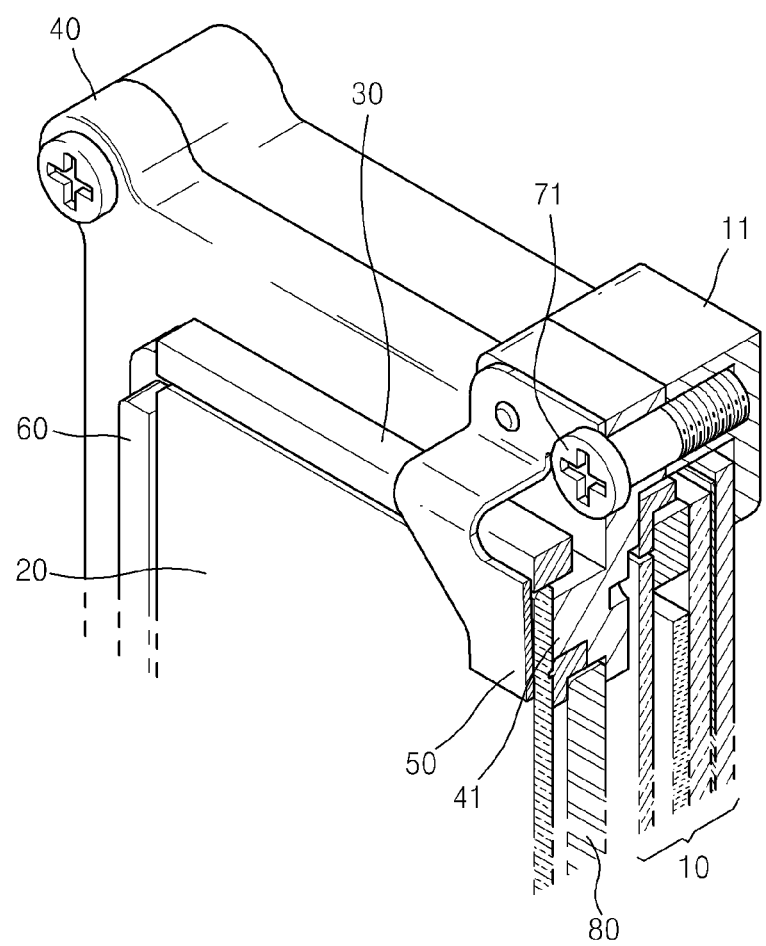
FIG. 3 is a perspective view illustrating an enlarged cross-section of a part of the photographing apparatus of FIG. 2, according to an embodiment.
Figure 4:
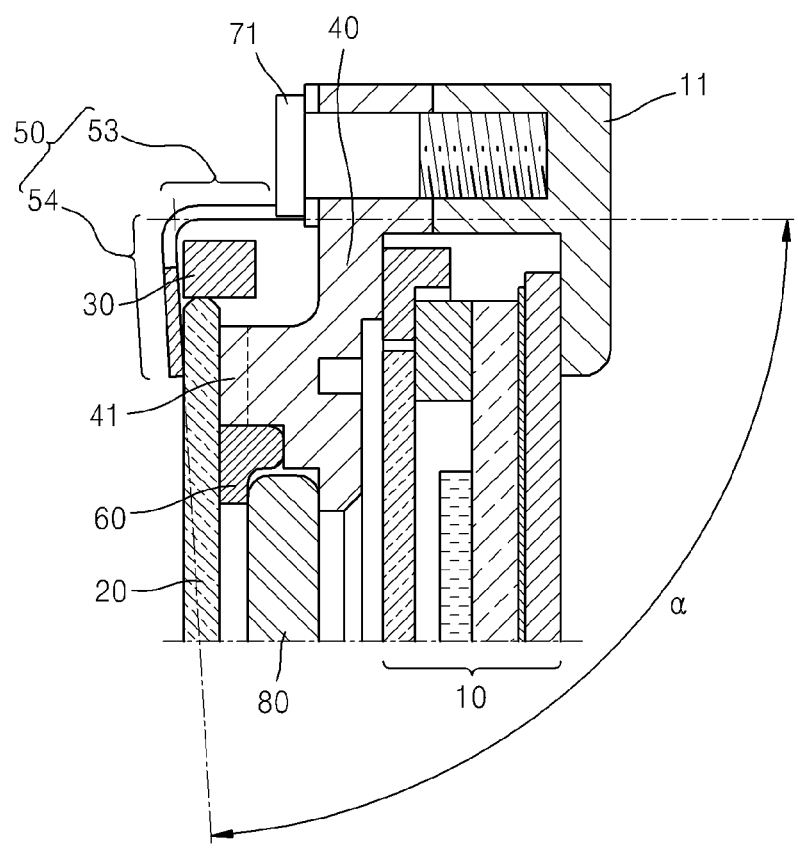
FIG. 4 is a cross-sectional view along a line IV-IV, illustrating a side of the photographing apparatus of FIG. 2, according to an embodiment.

FIG. 3 is a perspective view illustrating an enlarged cross-section of a part of the photographing apparatus of FIG. 2, according to an embodiment. FIG. 4 is a cross-sectional view along a line IV-IV, illustrating a side of the photographing apparatus of FIG. 2, according to an embodiment. Referring to FIG. 4, in the photographing apparatus in the embodiment of FIG. 2, the vibration plate 20, the support frame 40, and the imaging device support unit 11 which is coupled with the imaging device 10 are connected to each other by using the coupling units 71 and 72. The support frame 40 and the imaging device support unit 11 may be additionally connected by using the coupling units 73 and 74 located at two diagonally opposite corners of the support frame.

Each element may be easily coupled according to the coupling structure described above.

Referring to FIGS. 3 and 4, the vibration generator 30 is mounted on the vibration plate 20, and the support frame 40 supports the vibration plate 20.

The support frame 40 includes the protruding portion 41. The protruding portion 41 contacts the vibration plate 20 and supports a rear surface of the vibration plate 20 which is pressed by the vibration plate pressing unit 50.

The vibration plate pressing unit 50 includes a connection portion 53, which extends from the support frame 40 in a direction toward the object and is separated from the vibration plate 20, and a bending portion 54, which extends from the connection portion 53 and is inclined toward the vibration plate 20.

The vibration plate pressing unit 50 surrounds the vibration generator 30 without contacting it so that generation of a vibration from the vibration generator 30 is not obstructed. One end of the bending portion 54 needs to contact the vibration plate 20 so that the bending portion 54 presses the vibration plate 20. Therefore, the bending portion 54 may be inclined in a direction from the connection portion 53 to the vibration plate 20.

Accordingly, an angle α between the connection portion 53 and the bending portion 54 may be less than 90 degrees. A degree of pressing is different according to an inclination degree of the bending portion 53, which may be changed in a design process.

As the vibration plate pressing unit 50 presses at least one area of the vibration plate 20, a vibration in the pressed area of the vibration plate 20 may be suppressed compared to other areas.

Accordingly, although the vibration generator 30 generates a vibration having one frequency in response to an electrical signal, when the vibration plate 20 is pressed by the vibration plate pressing unit 50, the vibration is separated into at least two parts and the two parts of the vibration having different frequencies propagate to the vibration plate 20, thereby generating a resonant mode for each different frequency.

Furthermore, the vibration buffering unit 60 is interposed between the support frame 40 and the vibration plate 20. The vibration buffering unit 60 extends along an edge of the vibration plate 20 and supports the vibration plate 20 so that the vibration plate 20 may vibrate without restriction. The vibration buffering unit 60 also performs as a cushion for buffering a vibration generated by the vibration plate 20 in order to prevent the vibration from being transmitted to other elements.

The photographing apparatus may include two or more vibration plate pressing units 50.

Figure 5:
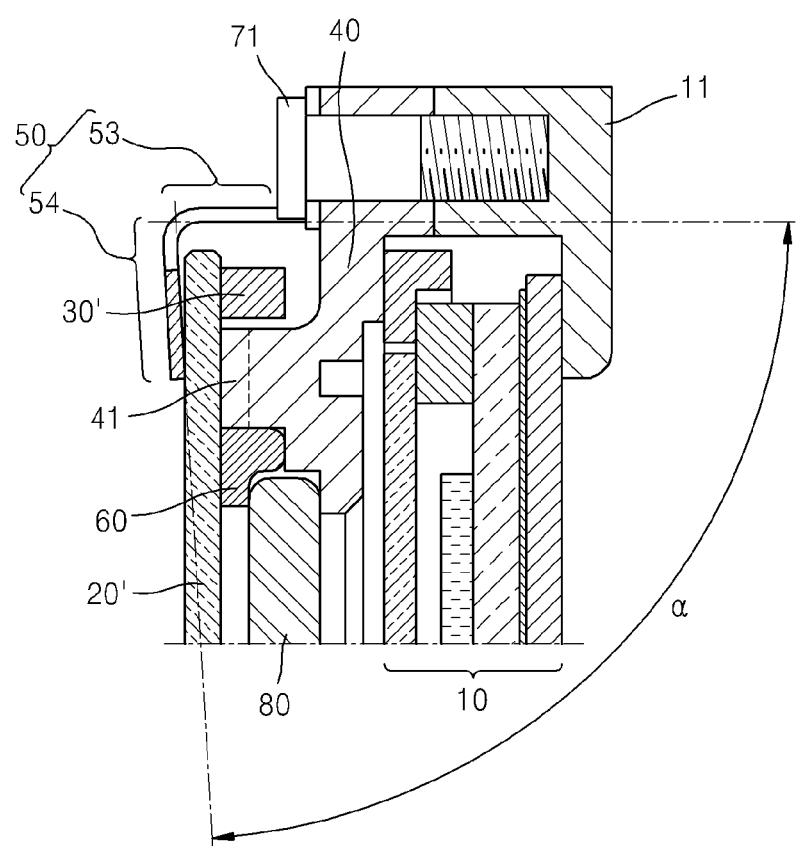
FIG. 5 is a cross-sectional view of a side of a photographing apparatus, according to another embodiment.

FIG. 5 is a cross-sectional view of a side of a photographing apparatus, according to another embodiment.

In the photographing apparatus in the current embodiment of FIG. 5, a structure of a vibration generator 30' is modified.

Unlike the vibration generator 30 of FIG. 4, which is located at a cross-section formed at one side of the vibration plate 20, the vibration generator 30' is mounted on a rear surface of a vibration plate 20' and vibrates the vibration plate 20'.

However, the location of the vibration generator 30' is not limited thereto and the vibration generator 30' may be mounted in any area of the vibration plate 20'.

Furthermore, a relative size of the vibration generator 30' with respect to the vibration plate 20' may be variously modified.

Figure 6:
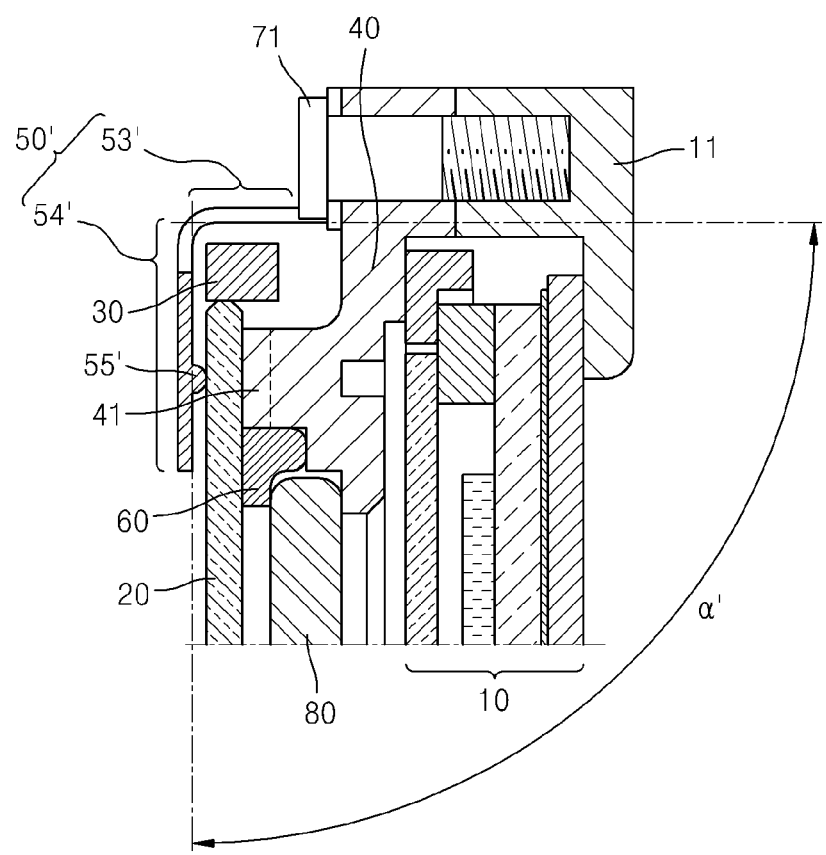
FIG. 6 is a cross-sectional view of a side of a photographing apparatus, according to another embodiment.

FIG. 6 is a cross-sectional view of a side of a photographing apparatus, according to another embodiment.

In the photographing apparatus in the current embodiment of FIG. 6, a structure of a vibration plate pressing unit 50' is modified.

The vibration plate pressing unit 50' includes a connection portion 53' and a bending portion 54'. An angle α' between the connection portion 53' and the bending portion 54' may be 90 degrees. However, this should not be construed as limiting.

The bending portion 54' includes a protruding projection portion 55' contacting the vibration plate 20. The protruding projection portion 55' is formed at a location corresponding to a protruding portion 41 of a support frame 40 and presses the vibration plate 20.

The vibration plate pressing unit 50' is connected to the support frame 40 and the vibration plate pressing unit 50' including the protruding projection portion 55' presses the vibration plate 20, and thus the vibration with one frequency is separated into two parts by pressing the vibration plate 20. The vibration plate pressing unit 50' may be modified to have a different structure from the embodiments of FIGS. 4 and 5.

Figure 7:
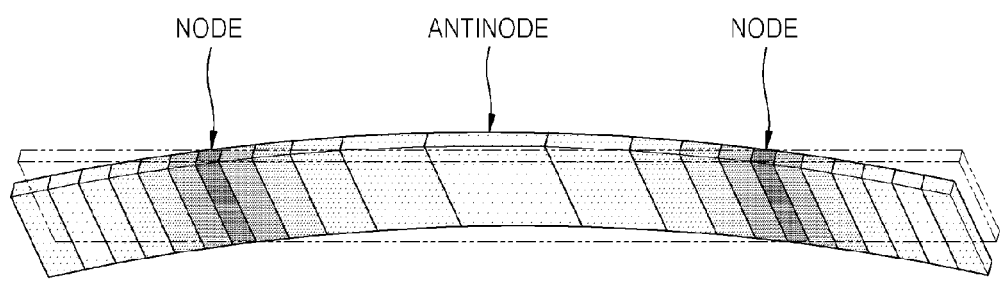
FIG. 7 illustrates a resonant mode of a vibration plate in which one antinode and two nodes are produced, according to an embodiment.
Figure 8:
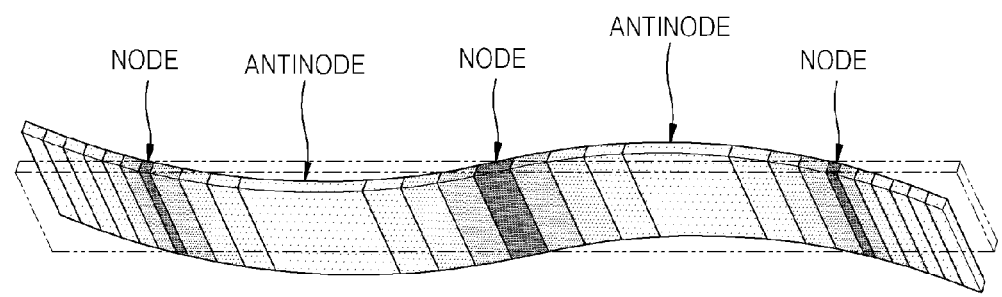
FIG. 8 illustrates a resonant mode of a vibration plate in which two antinodes and three nodes are produced, according to an embodiment.

FIG. 7 illustrates a resonant mode of a vibration plate in which one antinode and two nodes are produced, according to an embodiment, and FIG. 8 illustrates a resonant mode of a vibration plate in which two antinodes and three nodes are produced, according to an embodiment. FIG. 8 illustrates a case in which a frequency is higher than in the case of FIG. 7.

As illustrated in FIGS. 7 and 8, an antinode portion and a node portion are produced in a vibration generated in a resonant mode. In the antinode portion of the vibration, as the vibration amplitude is large, dust accumulated on a vibration plate may be efficiently removed. However, in the node portion of the vibration, as the vibration amplitude is zero, dust may not be removed.

In the photographing apparatus in the above described embodiments, when the vibration generator 30 is driven at one frequency, a vibration that propagates in the vibration plate 20 is separated into two parts so as to produce two vibration modes. Accordingly, a node may not be produced in the entire vibration plate 20. For example, when both the resonant modes of FIGS. 7 and 8 are applied to the same flat surface, node portions do not overlap with each other. Therefore, the entire vibration plate 20 may vibrate with enough amplitude for removing dust via one vibration generator 30 vibrating by a driving signal at one frequency, so that dust accumulated on the vibration plate 20 may be effectively removed.

Figure 9:
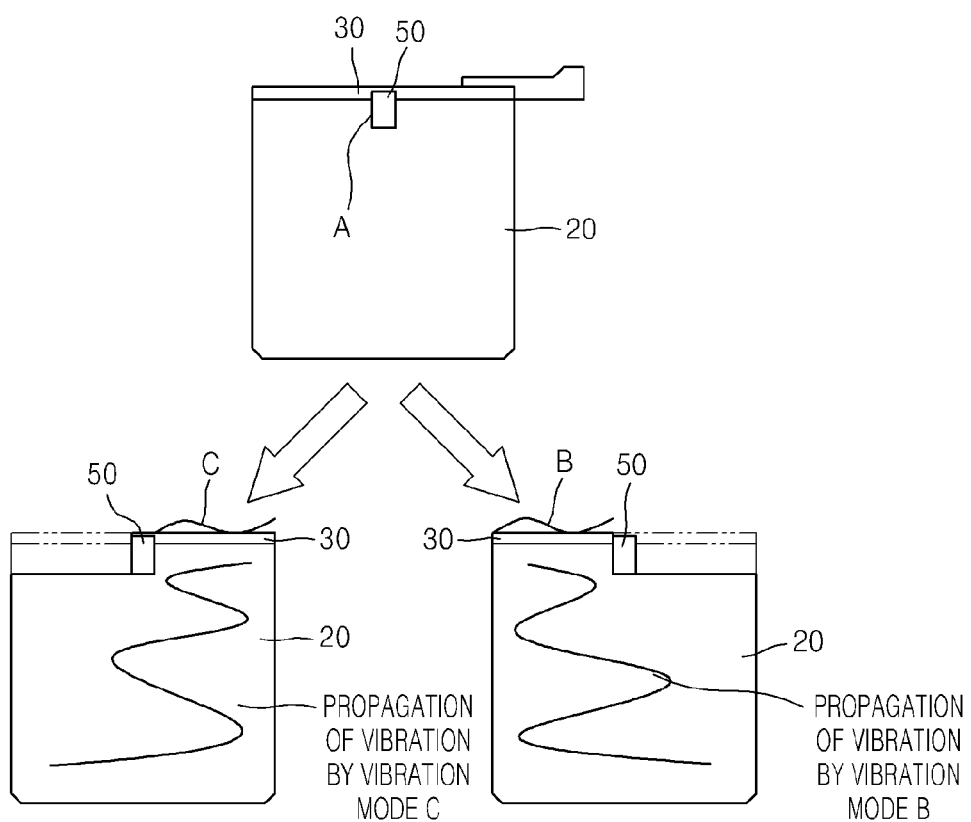
FIG. 9 illustrates propagation of a vibration in a vibration plate of the photographing apparatus of FIG. 1, according to an embodiment.

FIG. 9 illustrates propagation of a vibration in the vibration plate 20 of the photographing apparatus of FIG. 1, according to an embodiment.

Referring to FIG. 9, as a vibration is suppressed in a first area A which is pressed by the vibration plate pressing unit 50, vibrations with different types of vibration modes propagate respectively in a second area B and a third area C. Hereinafter, a vibration mode in the second area B is referred to as a vibration mode B, and a vibration mode in the third area C is referred to as a vibration mode C. Therefore, although a driving signal of one frequency is transmitted to the vibration generator 30, the driving signal has the same effect as two signals of different frequencies which are input to the vibration generator 30 and vibrate the vibration generator 30.

At each area of a surface of the vibration plate 20, a vibration amplitude is created as a vibration caused by the vibration mode B and a vibration caused by the vibration mode C are synthesized. When observing an arbitrary point on a surface of the vibration plate 20, even if a node is formed and the vibration amplitude becomes smaller at the observation point due to vibration propagation by the vibration mode B, a node is not produced due to vibration propagation by the vibration mode C.

As such, by propagating a vibration caused by the vibration mode B and a vibration caused by the vibration mode C together, deterioration of vibration amplitude at a location of a node may be compensated for by using vibration propagation due to a different vibration mode, thereby remarkably reducing the number of nodes formed on the vibration plate 20. Therefore, the number of nodes where vibration amplitude is zero may be decreased in the entire area of the vibration plate 20.

A location of a node on a surface of the vibration plate 20 in each vibration mode may be changed according to a frequency of an input signal. Therefore, by setting the frequency to an optimum value, generation of an area on a surface of the vibration plate 20 where the vibration amplitude is locally deteriorated may be minimized.

In order to prevent creation of a node of the vibration amplitude in all area of the vibration plate 20, a frequency of an input signal provided to the vibration generator 30 is set to an optimum value. Accordingly, by changing a frequency input to the vibration generator 30, a frequency for creating a vibration amplitude of a predetermined value or higher in each area of the vibration plate 20 is obtained respectively for the vibration mode B and the vibration mode C.

As described above, a photographing apparatus according to the above described embodiments has a simple structure for effectively removing dust from the entire area of the vibration plate 20 by transmitting vibrations in different modes to a surface of the vibration plate 20 by using one vibration generator.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A photographing apparatus comprising:
   an imaging device that converts an optical image of an object into an electrical signal;
   a vibration plate disposed at a front direction of the imaging device;
   a vibration generator which is mounted on the vibration plate and vibrates the vibration plate;
   a support frame which is located between the imaging device and the vibration plate, and supports edges of the vibration plate; and
   a vibration plate pressing unit which is connected to the support frame and comprises a part which presses a partial area of the vibration plate to generate different resonant modes of vibration in the vibration plate,
   wherein the partial area of the vibration plate corresponds to a middle region of at least one edge of the vibration plate.

2. The photographing apparatus of claim 1, wherein the part of the vibration plate pressing unit is in contact with the vibration plate for pressing a front surface of the partial area of the vibration plate.

3. The photographing apparatus of claim 1, wherein the support frame comprises a protruding portion which protrudes toward the vibration plate and supports a rear side of the vibration plate, and the protruding portion is located at a position corresponding to the partial area of the vibration plate which is pressed by the vibration plate pressing unit.

4. The photographing apparatus of claim 1, wherein the vibration plate is a low pass filter (LPF).

5. The photographing apparatus of claim 1, wherein the vibration generator is a piezoelectric device.

6. A photographing apparatus comprising:
an imaging device that converts an optical image of an object into an electrical signal;
a vibration plate disposed at a front direction of the imaging device;
a vibration generator which is mounted on the vibration plate and vibrates the vibration plate;
a support frame which is located between the imaging device and the vibration plate, and supports edges of the vibration plate; and
a vibration plate pressing unit which is connected to the support frame and comprises a part which presses at least an area of the vibration plate;
wherein the vibration plate pressing unit comprises a connection portion which extends from the support frame toward the object and is separated from the vibration plate, and a bending portion which bends at the connection portion and extends along a front surface of the vibration plate.

7. The photographing apparatus of claim 6, wherein an end of the bending portion is inclined to press the vibration plate.

8. The photographing apparatus of claim 6, wherein the bending portion further comprises a protruding projection portion that presses the vibration plate.

9. The photographing apparatus of claim 1, further comprising a vibration buffering unit which is disposed between the support frame and the vibration plate and buffers a vibration of the vibration plate.

10. The photographing apparatus of claim 3, further comprising a vibration buffering unit which is disposed between the support frame and the vibration plate and buffers a vibration of the vibration plate.

11. The photographing apparatus of claim 10, wherein the vibration buffering unit comprises a groove which is formed in an area corresponding to the protruding portion so that the protruding portion penetrates toward the vibration plate.

12. The photographing apparatus of claim 6, wherein the vibration plate is a low pass filter (LPF).

13. The photographing apparatus of claim 6, wherein the vibration generator is a piezoelectric device.

14. The photographing apparatus of claim 6, further comprising a vibration buffering unit which is disposed between the support frame and the vibration plate and buffers a vibration of the vibration plate.

15. A photographing apparatus comprising:
an imaging device that converts an optical image of an object into an electrical signal;
a vibration plate disposed at a front direction of the imaging device;
a vibration generator which is mounted on the vibration plate and vibrates the vibration plate;
a support frame which is located between the imaging device and the vibration plate, and supports edges of the vibration plate; and
a vibration plate pressing unit which is connected to the support frame and comprises a part which presses a partial area of the vibration plate that is smaller than an entire perimeter of the vibration plate to generate different resonant modes of vibration in the vibration plat;
wherein the partial area of the vibration plate corresponds to a middle region of at least one edge of the vibration plate.

16. The photographing apparatus of claim 15, wherein the partial area of the vibration plate smaller than an entire perimeter of the vibration plate is a less than an entire single edge of the perimeter.

\* \* \* \* \*

UNITED STATES PATENT AND TRADEMARK OFFICE
CERTIFICATE OF CORRECTION

PATENT NO. : 8,599,308 B2  
APPLICATION NO. : 13/282883  
DATED : December 3, 2013  
INVENTOR(S) : Eun-ho Ji and Chi-hun Hwang It is certified that error appears in the above-identified patent and that said Letters Patent is hereby corrected as shown below:

IN THE CLAIMS:

Claim 15, Column 10, line 26, replace "the vibration plat;" with -- the vibration plate, --

Claim 16, Column 10, line 32, replace "the vibration plate is a less than" with -- the vibration plate is less than --

Signed and Sealed this  
Twentieth Day of May, 2014

Michelle K. Lee  
*Deputy Director of the United States Patent and Trademark Office*